(12) United States Patent
Shibasaki

(10) Patent No.: US 11,436,456 B2
(45) Date of Patent: Sep. 6, 2022

(54) DEVICE MANAGEMENT SYSTEM, SERVER, AND METHOD OF CONTROLLING DEVICE MANAGEMENT SYSTEM

(71) Applicant: SEIKO EPSON CORPORATION, Tokyo (JP)

(72) Inventor: Yoshiaki Shibasaki, Aizuwakamatsu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/158,053

(22) Filed: Jan. 26, 2021

(65) Prior Publication Data

US 2021/0232877 A1 Jul. 29, 2021

(30) Foreign Application Priority Data

Jan. 29, 2020 (JP) .............................. JP2020-012397

(51) Int. Cl.
*G06K 15/00* (2006.01)
*G06K 15/10* (2006.01)
*G06N 5/04* (2006.01)
*G06N 20/00* (2019.01)
*G06Q 30/06* (2012.01)

(52) U.S. Cl.
CPC ....... *G06K 15/4075* (2013.01); *G06K 15/102* (2013.01); *G06N 5/04* (2013.01); *G06N 20/00* (2019.01); *G06Q 30/0635* (2013.01)

(58) Field of Classification Search
CPC .................................................. G06K 15/4075
USPC .......................................................... 358/1.15
See application file for complete search history.

(56) References Cited

U.S. PATENT DOCUMENTS

| | | | |
|---|---|---|---|
| 10,986,475 B1* | 4/2021 | Grosman | G06Q 30/0603 |
| 2013/0028616 A1* | 1/2013 | Kunihiro | G06F 3/1204 |
| | | | 399/81 |
| 2021/0109687 A1* | 4/2021 | Harai | G06F 3/1286 |
| 2021/0192598 A1* | 6/2021 | Yoshida | G06N 3/084 |

FOREIGN PATENT DOCUMENTS

JP 2016-045550 A 4/2016

\* cited by examiner

*Primary Examiner* — Jacky X Zheng
(74) *Attorney, Agent, or Firm* — Workman Nydegger

(57) ABSTRACT

A server includes: a storage control section storing, in a storage section, relationship information that indicates a relationship between attribute information indicating an attribute of a user of a device and consumption information indicating consumption of a consumable product of the device; an acquisition section acquiring the attribute information of a first user; and a predicted consumption calculation section calculating, based on the attribute information of the first user and the relationship information, predicted consumption of the consumable product of the device used by the first user.

9 Claims, 10 Drawing Sheets

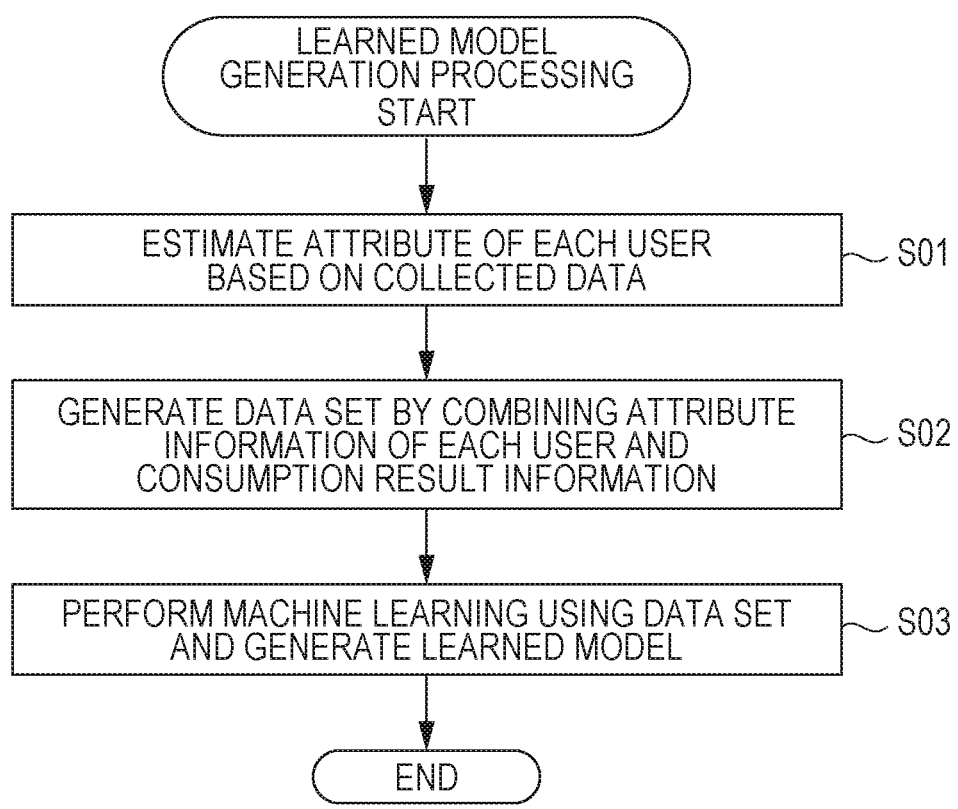

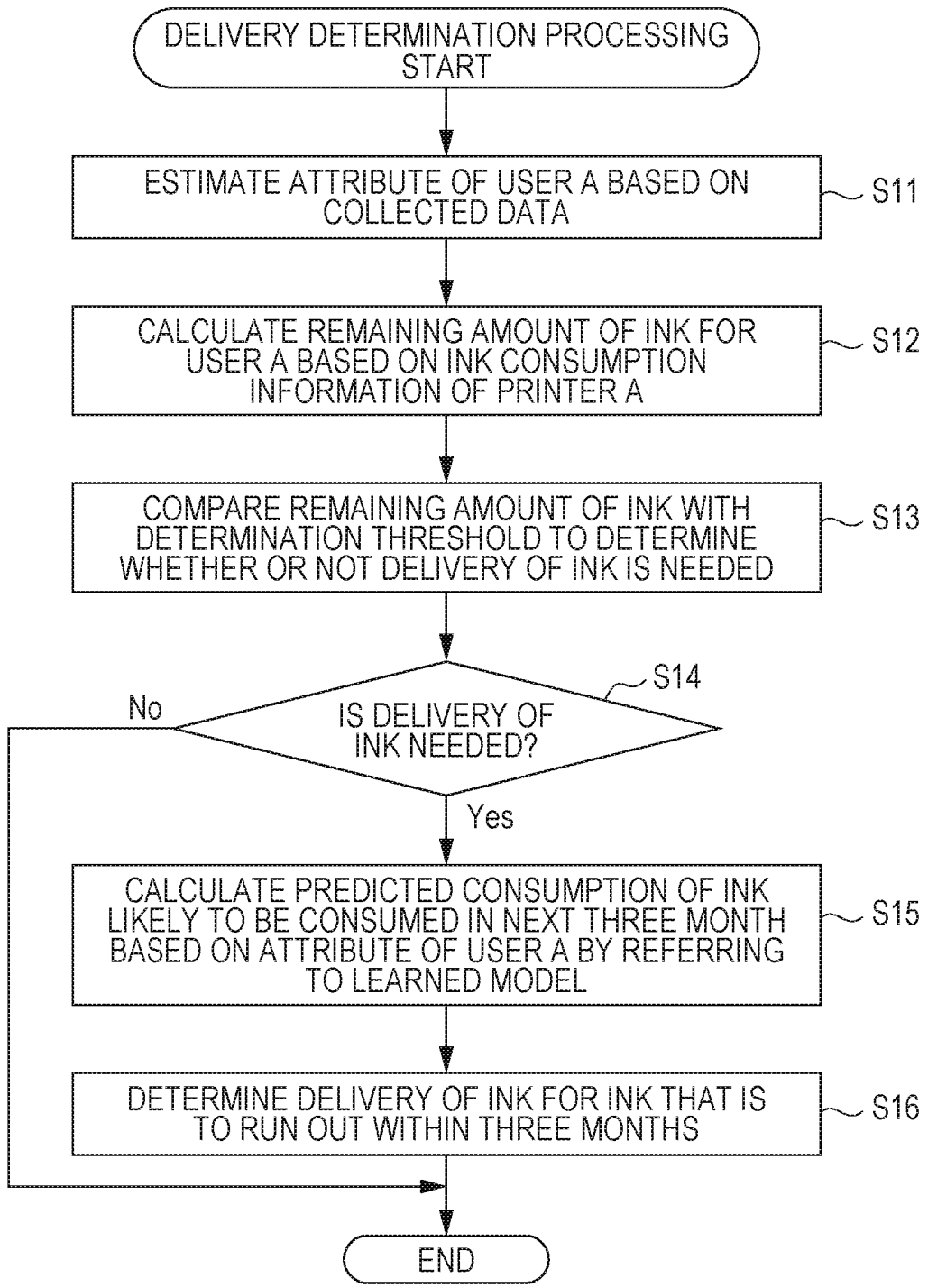

DEVICE MANAGEMENT SYSTEM, SERVER, AND METHOD OF CONTROLLING DEVICE MANAGEMENT SYSTEM

The present application is based on, and claims priority from JP Application Serial Number 2020-012397, filed Jan. 29, 2020, the disclosure of which is hereby incorporated by reference herein in its entirety.

BACKGROUND

1. Technical Field

The present disclosure relates to a device management system, a server, and a method of controlling the device management system.

2. Related Art

JP-A-2016-045550 discloses the following printing consumable product management system. The printing consumable product management system determines whether or not a first consumable product is to be replaced by comparing consumable product information regarding consumption of the first consumable product of a printer with a first threshold value, and determines whether or not a second consumable product is to be replaced by comparing consumable product information regarding consumption of the second consumable product of the printer with a second threshold value when it is determined that the first consumable product is to be replaced. When it is determined that the second consumable product is to be replaced, the printing consumable product management system instructs delivery of the first consumable product and the second consumable product. In the printing consumable product management system, when it is determined that the first consumable product and the second consumable product are to be replaced, the first consumable product and the second consumable product are delivered together, and it is possible to reduce the delivery cost of the consumable products compared with a case where the first consumable product and the second consumable products are separately delivered.

In JP-A-2016-045550, whether or not a consumable product is to be replaced is determined only by comparing consumable product information with a threshold value, and consumption of a consumable product is not predicted. Therefore, the delivery cost of the consumable product is not sufficiently reduced.

SUMMARY

According to an aspect of the present disclosure, a device management system includes a storage control section storing, in a storage section, relationship information that indicates a relationship between attribute information indicating an attribute of a user of a device and consumption information indicating consumption of a consumable product of the device, an acquisition section acquiring the attribute information of a first user, and a predicted consumption calculation section calculating, based on the attribute information of the first user and the relationship information, predicted consumption of the consumable product of the device used by the first user.

According to another aspect of the present disclosure, a server includes a storage control section storing, in a storage section, relationship information that indicates a relationship between attribute information indicating an attribute of a user of a device and consumption information indicating consumption of a consumable product of the device, an acquisition section acquiring the attribute information of a first user, and a predicted consumption calculation section calculating, based on the attribute information of the first user and the relationship information, predicted consumption of the consumable product of the device used by the first user.

According to still another aspect of the present disclosure, a method of controlling a device management system causes a computer to perform causing a storage section to store relationship information that indicates a relationship between attribute information indicating an attribute of a user of a device and consumption information indicating consumption of a consumable product of the device, acquiring the attribute information of the first user, and calculating, based on the attribute information of the first user and the relationship information, predicted consumption of the consumable product of the device used by the first user.

BRIEF DESCRIPTION OF THE DRAWINGS

FIG. 9 is a flowchart illustrating a flow of learned model generation processing.

FIG. 10 is a flowchart illustrating a flow of delivery determination processing.

DESCRIPTION OF EXEMPLARY EMBODIMENTS

Figure 1:
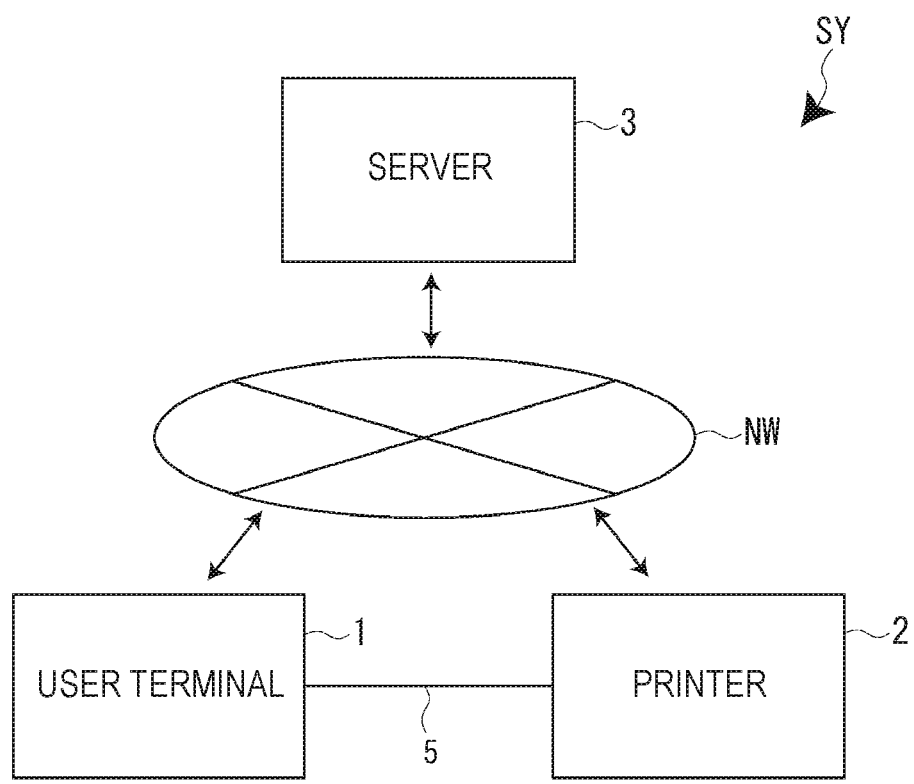
FIG. 1 is a system configuration diagram of a device management system.

Hereinafter, a device management system, a server, and a method of controlling the device management system according to an embodiment will be described with reference to the accompanying drawings. FIG. 1 is a system configuration diagram of a device management system SY. The device management system SY includes one or more user terminals 1, one or more printers 2, a server 3, and a network NW connecting them. The printer 2 is an example of a "device".

Examples of the network NW include an Internet communication network. Further, the user terminal 1 and the printer 2 are connected to each other via a communication line 5. Examples of the communication line 5 include a cable. In the present embodiment, a universal serial bus (USB) cable is illustrated as the communication line 5. Note that the user terminal 1 and the printer 2 may be connected to each other via a network such as a local area network (LAN) or via wireless communication, instead of the communication line 5.

The device management system SY is a system that provides a delivery service that delivers a consumable product of the printer 2 to a user who uses the printer 2. The user instructs the printer 2 to perform printing by using the user terminal 1. Further, the server 3 is operated by a service provider who provides the delivery service.

The user provides subscriber information to the service provider to receive the delivery service. The subscriber information includes identification information of the user, identification information of the user terminal 1 used by the user, identification information of the printer 2 used by the user, and delivery destination information indicating a delivery destination of the consumable product. The server 3 stores the subscriber information as a part of collected data 52 (see FIG. 4).

Note that the user pays a service usage fee to the service provider for the delivery service at a predetermined interval such as monthly or annually. Further, the delivery service is a subscription-type service, and the service usage fee does not vary according to the amount of delivered consumable product, and is a fixed fee. Therefore, the user can use the printer 2 without worrying about consumption of the consumable product. Note that the service usage fee paid by the user may include but does not have to include a leasing fee or a rental fee for the printer 2.

When instructing the printer 2 to perform printing, the user terminal 1 transmits image data to the printer 2 and the server 3. Note that the type of the image data is not limited and may be an image file type, a print command type, or the like. Further, the type of image data transmitted to the printer 2 and the type of image data transmitted to the server 3 may be different from each other. The server 3 stores the image data transmitted from the user terminal 1 as a part of the collected data 52 (see FIG. 4). The server 3 uses the collected image data to estimate an attribute of the user, and details thereof will be described later. Note that, although a smartphone is illustrated as the user terminal 1 in the present embodiment, various information processing terminals such as a personal computer (PC) and a tablet terminal may be used as the user terminal 1.

The printer 2 performs printing on a printing medium such as a paper sheet based on the image data transmitted from the user terminal 1. The printer 2 according to the present embodiment performs printing by an ink jet method. That is, the printer 2 consumes ink, which is a coloring agent for printing, by performing printing by the ink jet method. In addition, the printer 2 according to the present embodiment stores the ink in an ink tank, and supplies the ink from the ink tank to a print head. The ink is an example of a "consumable product". The service provider delivers an ink bottle containing the ink to the user. The ink bottle is an example of a "container". When a remaining amount of the ink in the ink tank became small, the user pours an appropriate amount of ink from the ink bottle delivered from the service provider into the ink tank. Note that the printer 2 includes a plurality of ink tanks for respective colors, and ink bottles for a plurality of colors are also prepared for the respective ink tanks. Note that the color of the ink is an example of the "type of the consumable product".

The server 3 monitors consumption of ink of each color in the printer 2, and issues, based on a result of the monitoring, an instruction to deliver the ink bottle to an address based on the delivery destination information stored as a part of the subscriber information. Note that, as described above, the delivery service implemented by the device management system SY has a great advantage in that the user can use the printer 2 without worrying about the consumption of the ink, and therefore, the server 3 is to deliver the ink bottle so that the printer 2 does not run out of ink.

Figure 4:
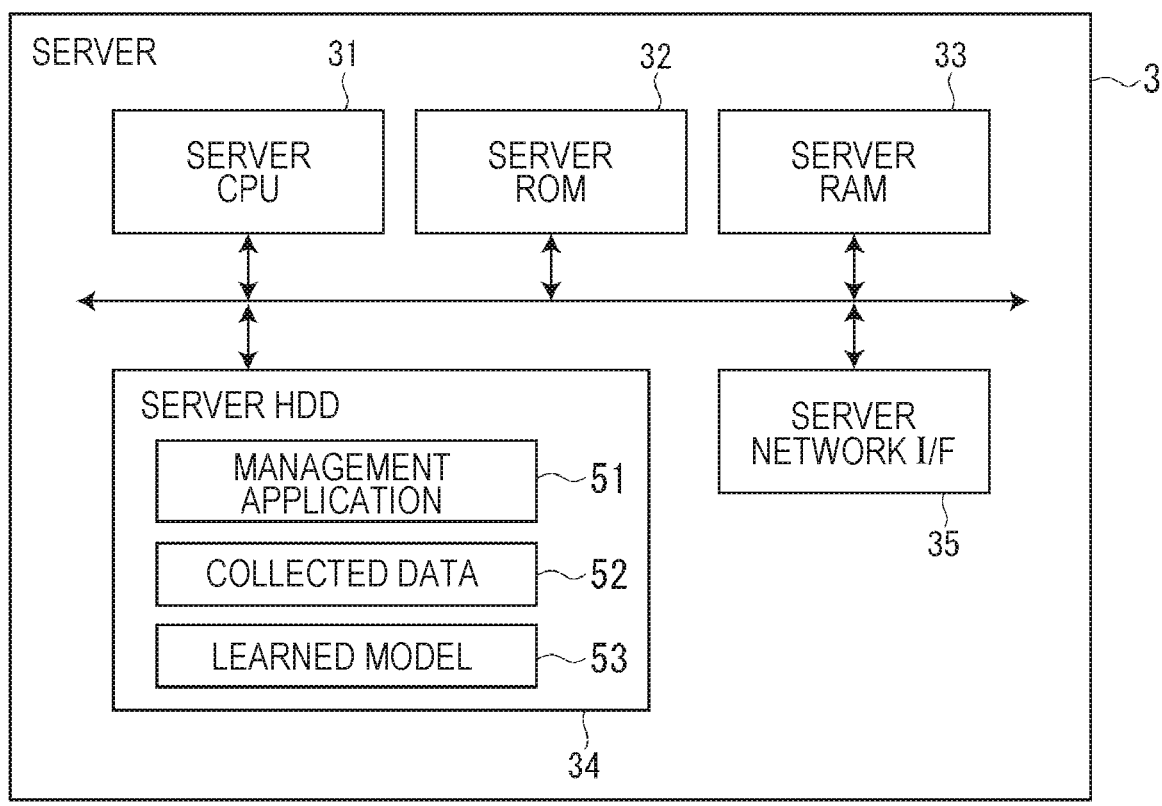
FIG. 4 is a block diagram illustrating a hardware configuration of a server.

The server 3 collects ink consumption information indicating the consumption of the ink of each color from the printer 2, and stores the collected ink consumption information as a part of the collected data 52 (see FIG. 4). The ink consumption information includes information indicating the number of ejections of the ink ejected from the print head at the time of printing of the image data, and the number of ejections of the ink ejected from the print head to clean the print head. Further, when ink suction is performed to clean the print head, the ink consumption information may include information indicating the amount of sucked ink. Note that the ink consumption information may be transmitted from the printer 2 to the server 3 through push transmission or pull transmission.

The server 3 calculates the remaining amount of the ink for the user based on the ink consumption information transmitted from the printer 2. Further, the server 3 determines that the ink bottle is to be delivered when the calculated remaining amount of the ink is less than a predetermined threshold value. Further, when the determination is made that the ink bottle is to be delivered, the server 3 calculates predicted consumption of the ink from the current time until a predetermined period of time elapses, and determines the number of ink bottles to be delivered according to the calculated predicted consumption. A method of calculating predicted consumption according to the attribute of the user will be described in detail later.

Figure 2:
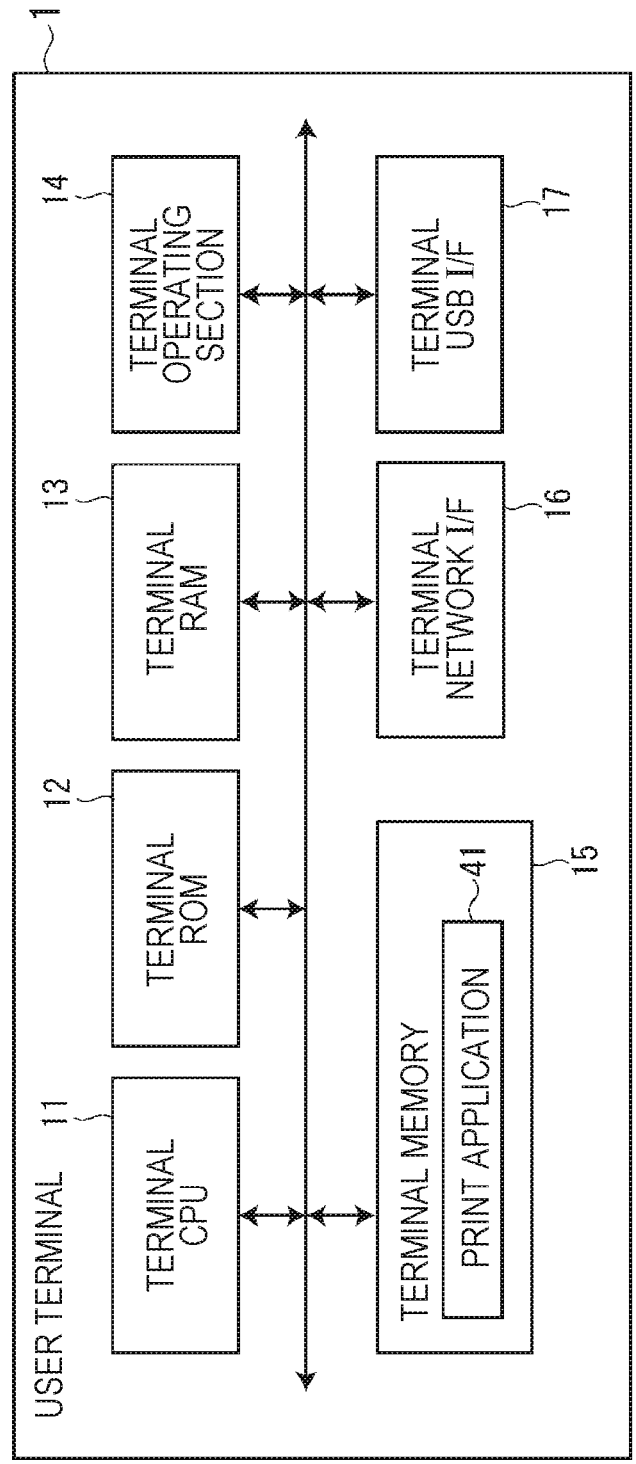
FIG. 2 is a block diagram illustrating a hardware configuration of a user terminal.

Next, hardware configurations of the user terminal 1, the printer 2, and the server 3 will be described with reference to FIGS. 2 to 4. FIG. 2 is a block diagram illustrating the hardware configuration of the user terminal 1. The user terminal 1 is, for example, a smartphone, and includes a terminal central processing unit (CPU) 11, a terminal read only memory (ROM) 12, a terminal random access memory (RAM) 13, a terminal operating section 14, a terminal memory 15, a terminal network interface 16, and a terminal USB interface 17.

The terminal CPU 11 loads various programs stored on the terminal ROM 12 or the terminal memory 15 into the terminal RAM 13, thereby controlling each section in the user terminal 1. Note that, as an alternative processor to the terminal CPU 11, a hardware circuit such as an application specific integrated circuit (ASIC) may be used. Further, the processor may have a configuration in which one or more CPUs and a hardware circuit such as an ASIC are operated in conjunction with each other.

The terminal operating section 14 is used by the user to perform various operations such as editing of image data. For example, the terminal operating section 14 is a touch panel. The terminal memory 15 is a non-volatile storage medium, and stores a print application 41. The print application 41 is an application for communication with the printer 2 and the server 3, and also functions as a print driver that controls the printer 2. The terminal CPU 11 transmits the image data to the printer 2 and the server 3 by executing the print application 41.

The terminal network interface 16 performs communication with the server 3 through the network NW. The terminal USB interface 17 performs communication with the printer 2 via the communication line 5 which is a USB cable.

Figure 3:
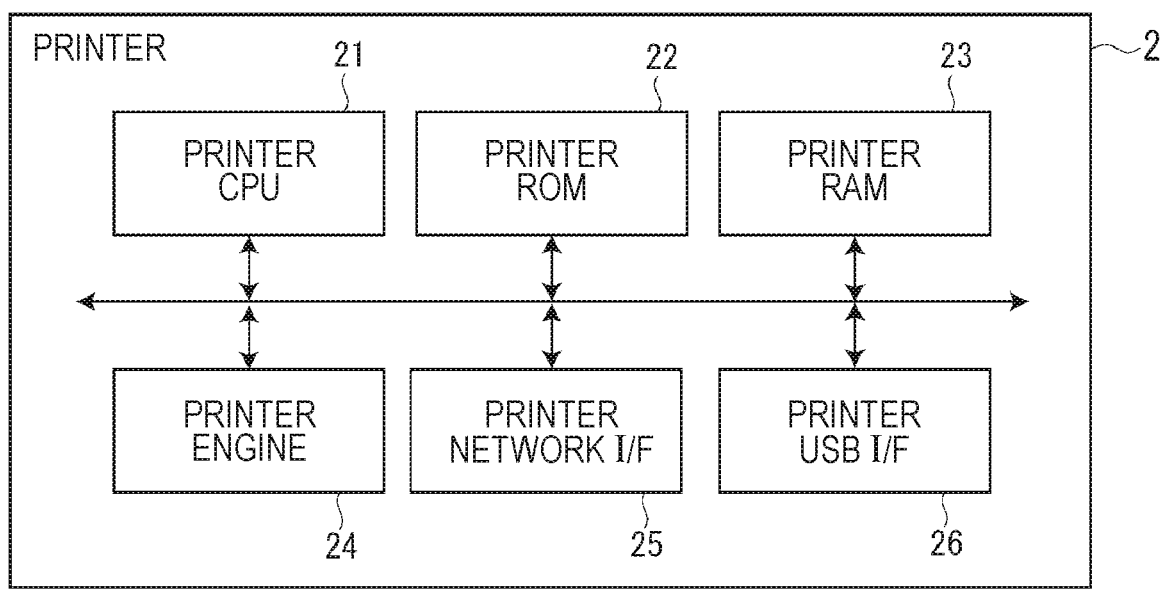
FIG. 3 is a block diagram illustrating a hardware configuration of a printer.

FIG. 3 is a block diagram illustrating the hardware configuration of the printer 2. The printer 2 includes a printer CPU 21, a printer ROM 22, a printer RAM 23, a printer engine 24, a printer network interface 25, and a printer USB interface 26.

The printer CPU 21 loads various programs such as firmware stored in the printer ROM 22 into the printer RAM 23, thereby controlling each section in the printer 2. The firmware includes a communication control program for performing communication with the user terminal 1 and the server 3. Note that the processor of the printer 2 may have a configuration in which a hardware circuit such as an ASIC is used in addition to a CPU, or in which a CPU and a hardware circuit are operated in conjunction with each other.

The printer engine 24 is a printing mechanism that performs printing on a printing medium. The printer engine 24 includes an ink jet-type print head, a head driving mechanism, a printing medium conveying mechanism, and the like.

The printer network interface 25 performs communication with the server 3 through the network NW. The printer USB interface 26 performs communication with the user terminal 1 via the communication line 5 which is a USB cable.

FIG. 4 is a block diagram illustrating the hardware configuration of the server 3. The server 3 includes a server CPU 31, a server ROM 32, a server RAM 33, a server hard disk drive (HDD) 34, and a server network interface 35. The server CPU 31 is an example of a "computer".

The server CPU 31 loads various programs stored in the server ROM 32 or on the server HDD 34 into the server RAM 33, thereby controlling each section in the server 3. Note that the processor of the server 3 may have a configuration in which a hardware circuit such as an ASIC is used in addition to a CPU, or in which a CPU and a hardware circuit are operated in conjunction with each other.

The server HDD 34 is a non-volatile auxiliary storage medium, and stores a management application 51, the collected data 52, and a learned model 53. The server HDD 34 is an example of a "storage section". Further, the learned model 53 is an example of "relationship information". The management application 51 is an application for the server CPU 31 to implement respective functions to be described later in FIG. 7. Further, the management application 51 includes a remote monitoring program that performs remote monitoring of the printer 2. The server CPU 31 acquires, from the printer 2, the ink consumption information and various information such as error information and a print log by executing the remote monitoring program.

Figure 5:
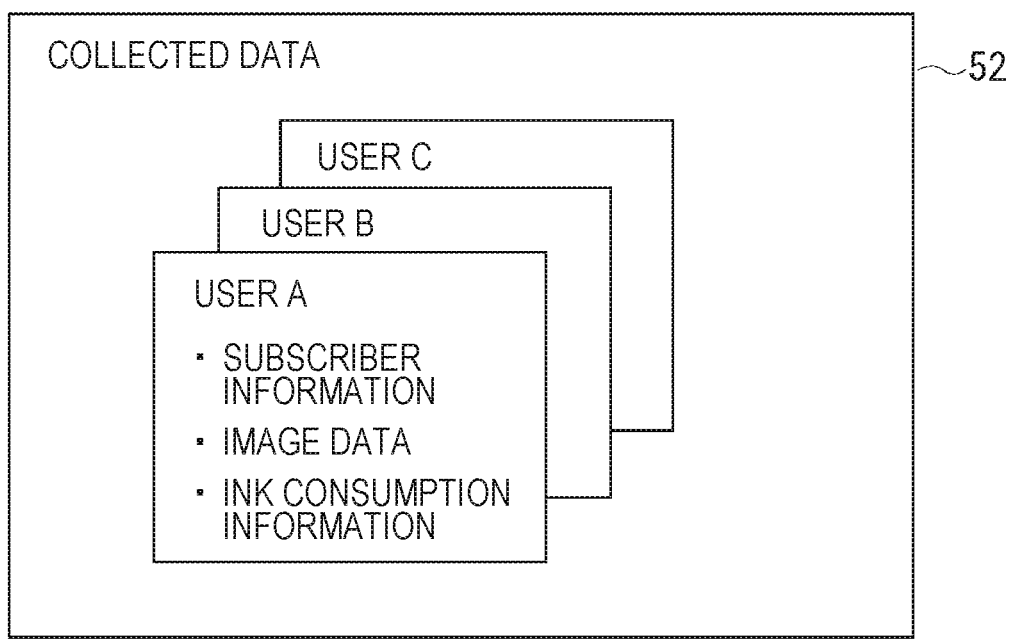
FIG. 5 is a diagram for describing collected data.

The collected data 52 is collected information stored for each user. FIG. 5 is a diagram for describing the collected data 52. As illustrated in FIG. 5, the collected data 52 includes the subscriber information, the image data, and the ink consumption information. The subscriber information is information that the user provides when subscribing to the service provider. As described above, the subscriber information includes personal information of the user, in addition to the identification information of the user, the identification information of the user terminal 1, the identification information of the printer 2, and the delivery destination information. The personal information is information indicating, for example, employment, age, address, preferences, and family members.

The image data is acquired from the user terminal 1. As described above, when transmitting the image data to the printer 2, the user terminal 1 also transmits the image data to the server 3. That is, the image data stored as the collected data 52 is image data printed by the printer 2. All image data printed after the user has subscribed may be stored on the server HDD 34. However, since storage capacity is limited, only image data for a past predetermined period may be stored.

Note that, when transmitting the image data to the server 3, the user terminal 1 may additionally transmit the identification information of the user terminal 1 and the identification of the printer 2 that performs printing. When the subscriber information indicating a combination of the identification information of the user terminal 1 and the identification information of the printer 2 is stored on the server HDD 34, the server 3 stores the transmitted image data as the collected data 52 of the user indicated by the subscriber information. In other words, the image data transmitted from the user terminal 1 to a printer that is not bound to the subscription is not collected as the collected data 52.

The ink consumption information is acquired from the printer 2. As described above, the ink consumption information is information indicating consumption of ink of each color. The server 3 calculates the remaining amount of the ink for the user and generates consumption result information indicating an ink consumption result based on the ink consumption information. The consumption result information is information indicating, for example, an ink consumption result for each month and each color, and is used to generate the learned model 53 to be described later. Ink consumption information indicating the total amount of ink consumed for printing and cleaning after the user has subscribed may be stored on the server HDD 34. However, since storage capacity is limited, only ink consumption information indicating the amount of ink consumed for printing and cleaning within a past predetermined period may be stored. Note that the predetermined period for which image data is stored and the predetermined period for which the ink consumption information is stored may be the same as each other or different from each other.

Meanwhile, the learned model 53 is a statistical model for calculating the predicted consumption of the ink of the printer 2 used by the user, in consideration of the attribute of the user. More specifically, a learned model generation section 140 to be described later learns, by machine learning, for a plurality of users, a combination of attribute information indicating an attribute of a user and consumption result information as a data set to generate the learned model 53. Note that "the printer 2 used by the user" denotes the printer 2 having the identification information associated with the identification information of the user by subscription information.

Figure 6:
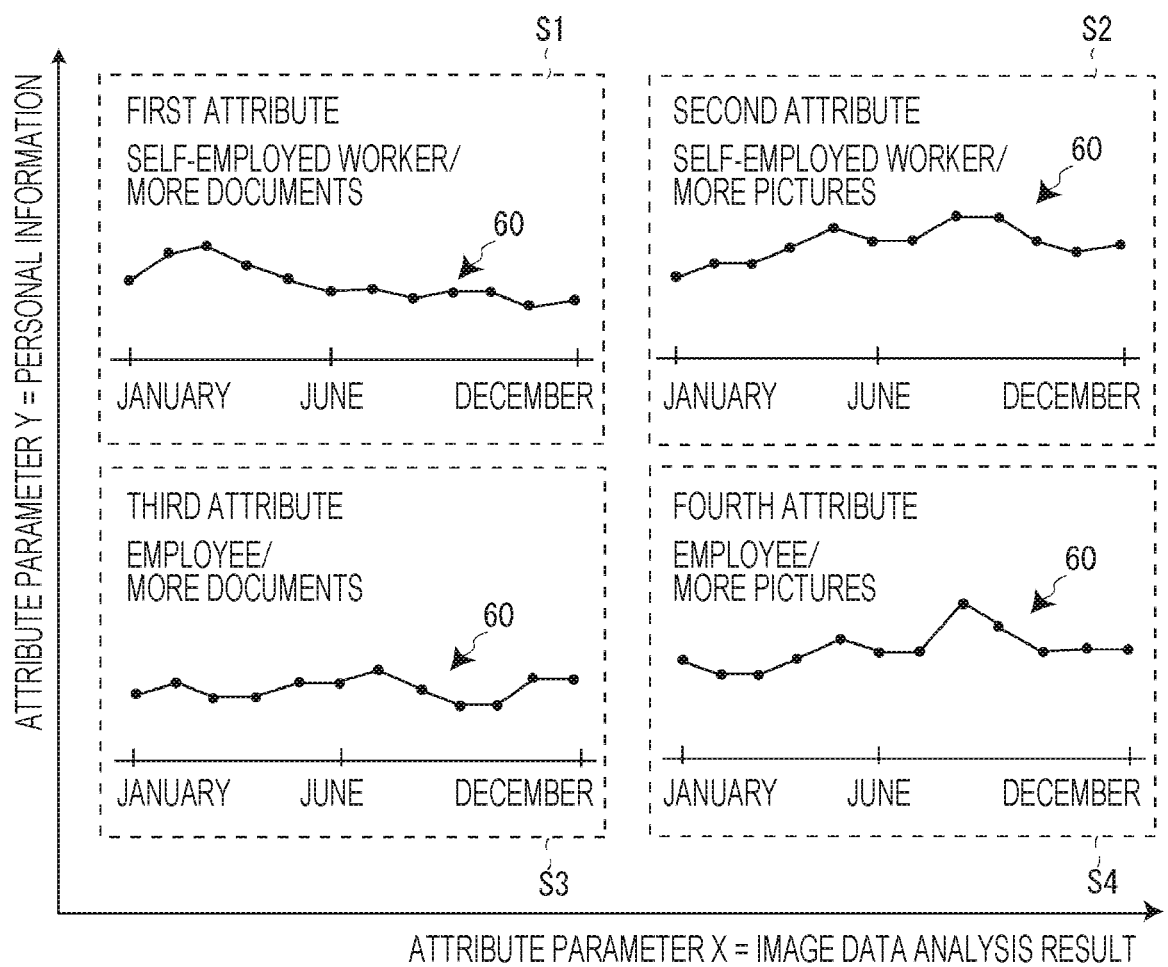
FIG. 6 is a diagram for describing a learned model.

FIG. 6 is a diagram for describing the learned model 53. As illustrated in FIG. 6, the learned model 53 represents predicted consumption of ink for each segment S obtained by clustering based on the attribute information. In the example in FIG. 6, four segments S obtained by clustering based on two types of attribute parameters are illustrated.

Further, in the example in FIG. 6, the server 3 estimates, based on an image data analysis result, an attribute parameter indicating whether more documents are to be printed or more pictures are to be printed. Hereinafter, the attribute parameter is referred to as an "attribute parameter X". Note that "more documents are to be printed" denotes that a proportion of the documents to be printed with respect to all of the printing is larger than a predetermined value. Similarly, "more pictures are to be printed" denotes that a proportion of the pictures to be printed with respect to all of the printing is larger than a predetermined value. Further, the server 3 determines an attribute parameter indicating whether the user is a self-employed worker or an employee based on the personal information of the user included in the subscriber information. Hereinafter, the attribute parameter is referred to as "attribute parameter Y". The server 3 finally estimates the attribute of the user based on a plurality of attribute parameters estimated and determined as described above. In other words, a combination of the "attribute parameters" is an "attribute". That is, in the example in FIG. 6, the server 3 estimates whether the attribute of the user is a first attribute indicating a self-employed worker and more documents, a second attribute indicating a self-employed worker and more pictures, a third attribute indicating an employee and more documents, or a fourth attribute indicating an employee and more pictures. A result of the estimation is the "attribute information". Further, in the learned model 53 illustrated in FIG. 6, four segments S including a first segment S1 corresponding to the first attribute, a second segment S2 corresponding to the second attribute, a third segment S3 corresponding to the third attribute, and a fourth segment S4 corresponding to the fourth attribute are obtained by clustering based on the attribute information.

Each segment S indicates monthly predicted consumption 60 which is a predicted consumption for each month. Note that, in the example in FIG. 6, the monthly predicted consumption 60 of each color is not illustrated, but the server 3 calculates the predicted consumption of the ink for each month and each color. As such, each segment S represents an ink consumption tendency of a user having an attribute of each segment for each month and each color. For example, in the example in FIG. 6, a user having the first attribute corresponding to the first segment S1 represents a tendency of increased ink consumption from February to March.

As such, the learned model 53 is obtained by learning, by machine learning, a combination of attribute information indicating an attribute of each user and consumption result information of the printer 2 used by each user, for a plurality of users. By using the learned model 53, the server 3 can predict future ink consumption of the printer 2 used by an arbitrary user in accordance with an attribute of the arbitrary user.

Figure 7:
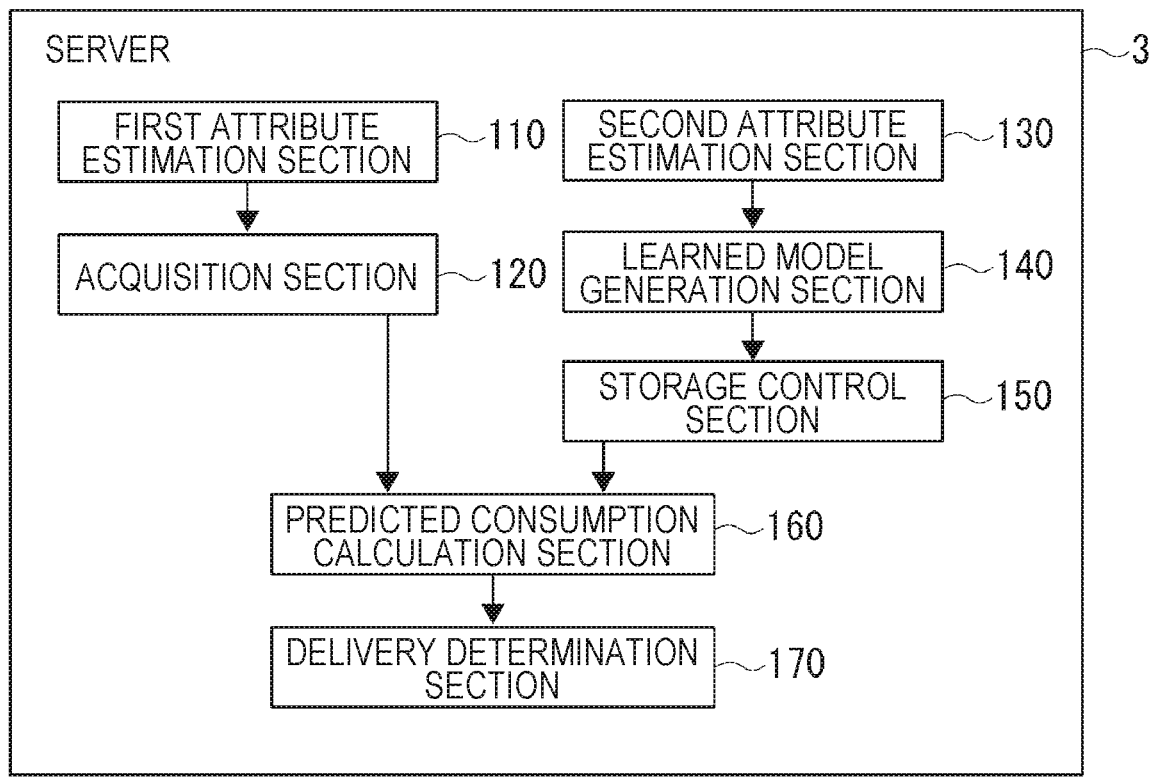
FIG. 7 is a block diagram illustrating a functional configuration of the server.

Next, a functional configuration of the server 3 will be described with reference to FIG. 7. The server 3 includes, as main functional components, a first attribute estimation section 110, an acquisition section 120, a second attribute estimation section 130, the learned model generation section 140, a storage control section 150, a predicted consumption calculation section 160, and a delivery determination section 170. These are functions implemented by the management application 51 executed by the server CPU 31.

Note that, in the following description, the printer 2 that is a target of predicted consumption calculation performed by the predicted consumption calculation section 160 is "printer A", and a user of the printer A is "user A". Further, subscriber information including identification information of the user A, identification information of the printer A, and personal information of the user A, image data for a past predetermined period, and ink consumption information for a past predetermined period are stored as the collected data 52 on the server HDD 34. Note that the user A is an example of a "first user". Further, the learned model 53 illustrated in FIG. 6 is stored on the server HDD 34.

The first attribute estimation section 110 estimates an attribute of the user A based on an analysis result of image data to be printed by the printer A. The attribute of the user A that is estimated based on the image data analysis result is the "attribute parameter X" illustrated in FIG. 6. The first attribute estimation section 110 analyzes the image data for the past predetermined period, the image data being acquired from the printer A and stored on the server HDD 34, and determines the type of printout or a print content. The type of printout is classified as, for example, a document, a picture, or other, and whether the type of printout is a document, a picture, or other is determined. Further, when the type of the printout is a picture, for example, as the print content, the presence or absence of a person, the sex of the person, the age group of the person, the shooting location, or the like is determined. Further, when the type of the printout is a document, for example, whether the document is a form, a manuscript, or other is determined. When the type of the printout or the print content is determined based on the image analysis result of the image data, the first attribute estimation section 110 estimates the "attribute parameter X" of the user A based on a result of the determination.

Meanwhile, the first attribute estimation section 110 determines the attribute of the user A based on the personal information of the user A stored on the server HDD 34. The attribute of the user A that is estimated based on the personal information is the "attribute parameter Y" illustrated in FIG. 6. The first attribute estimation section 110 determines the "attribute parameter Y" of the user A based on the user's employment, the user's age, the user's preference, and the user's family members included in the personal information.

Further, the first attribute estimation section 110 estimates, based on the "attribute parameter X" estimated from the image data analysis result and the "attribute parameter Y" determined from the personal information, to which of four attributes corresponding to four segments S the attribute of the user A corresponds. Note that although the first attribute estimation section 110 estimates the attribute of the user A based on two attribute parameters in the present embodiment, the first attribute estimation section 110 may also estimate the attribute of the user A based on one or three or more attribute parameters.

The acquisition section 120 acquires the attribute information indicating the attribute estimated by the first attribute estimation section 110.

Similar to the first attribute estimation section 110, the second attribute estimation section 130 estimates an attribute of each user of a plurality of users including the user A. That is, the second attribute estimation section 130 estimates an "attribute parameter X" of each user based on an analysis result of image data to be printed by the printer 2 used by each of the plurality of users.

Further, the second attribute estimation section 130 determines an "attribute parameter Y" of each user based on personal information of the plurality of users stored on the server HDD 34. The second attribute estimation section 130 estimates, based on the "attribute parameter X" estimated from the image data analysis result and the "attribute parameter Y" determined from the personal information, the attribute of each user.

The learned model generation section 140 generates the learned model 53 by learning, for the plurality of users, by machine learning, a combination of attribute information and consumption result information, which is a consumption result of the printer 2 used by each user, as a data set. Here, the attribute information used in the generation of the learned model 53 is information indicating the attribute estimated by the second attribute estimation section 130.

Figure 8:
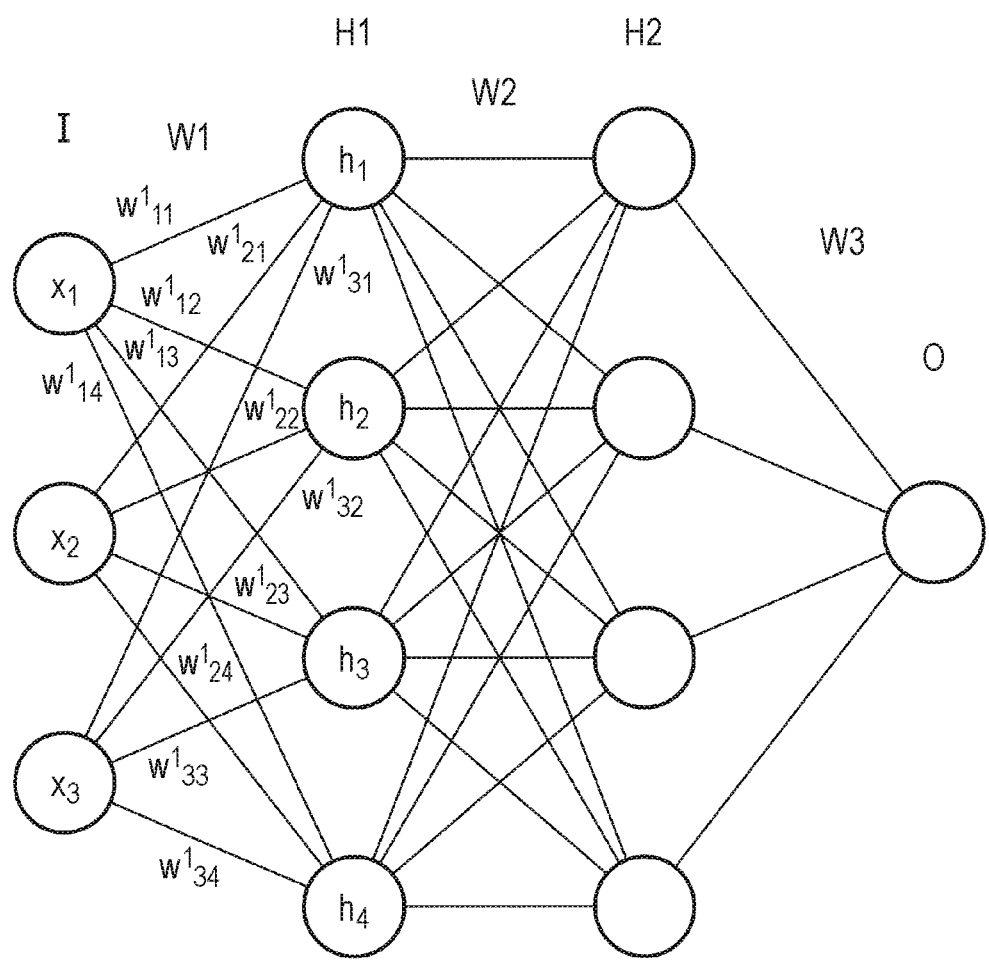
FIG. 8 is a diagram illustrating an example of a basic structure of a neural network.

Here, as a specific example of the machine learning, machine learning using a neural network will be described. FIG. 8 is a diagram illustrating an example of a basic structure of the neural network. The neural network is a mathematical model that simulates a brain function on a calculator. A circle in FIG. 8 is called a node or neuron. In the example in FIG. 8, the neural network includes an input layer, two intermediate layers, and an output layer. The input layer is represented by I, the intermediate layers are represented by H1 and H2, respectively, and the output layer is represented by O. Further, in the example in FIG. 8, the number of neurons of the input layer is three, the number of neurons of each of two intermediate layers is four, and the number of neurons of the output layer is one. However, the number of intermediate layers and the number of neurons included in each layer can be variously changed. The neurons included in the input layer are each coupled to the neurons of H1 which is a first intermediate layer. The neurons included in the first intermediate layer are each coupled to the neurons of H2 which is a second intermediate layer, and the neurons included in the second intermediate layer are each coupled to the neuron of the output layer. Note that the intermediate layer may also be referred to as a hidden layer.

The input layer includes the neurons that each output an input value. In the example in FIG. 8, the neural network receives $x_1$, $x_2$, and $x_3$ as inputs, and the neurons of the input layer output $x_1$, $x_2$, and $x_3$, respectively. Note that any pre-processing may be performed on the input value, and each neuron of the input layer may output a value after the pre-processing.

In each neuron of the intermediate layers and the output layer, an operation that emulates delivery of information as an electric signal in the brain is performed. In the brain, since ease of delivery of information is changed according to the connection strength of synapses, the connection strength is expressed as a weight W in the neural network. W1 of FIG. 8 is a weight between the input layer and the first intermediate layer. W1 represents a set of weights between given neurons included in the input layer and given neurons included in the first intermediate layer. When a weight between a p-th neuron of the input layer and a q-th neuron of the first intermediate layer is represented by $w^1_{pq}$, W1 of FIG. 8 is information including 12 weights, $w^1_{11}$ to $w^1_{34}$. In a broad sense, the weight W1 is information including as many weights as the product of the number of neurons of the input layer and the number of neurons of the first intermediate layer.

In the first intermediate layer, an operation expressed by the following Equation (1) is performed in the first neuron. In one neuron, an operation of calculating a product-sum of outputs of respective neurons of an immediately previous layer that are connected to the neuron and adding a bias is performed. In the following Equation (1), the bias is $b_1$.

$$h_1 = f\left(\sum_i w^1_{i1} \cdot x_i + b_1\right) \quad (1)$$

Further, as represented in Equation (1), in the operation in one neuron, an activation function f, which is a non-linear function, is used. As the activation function f, for example, a ReLU function represented in the following Equation (2) is used. The ReLU function is a function that has a value of 0 when a variable is 0 or less and that has a value of the variable when the variable is more than 0. However, it has been known that various functions can be used as the activation function f. A sigmoid function may be used, or a function obtained by modifying a ReLU function may be used. In Equation (1), an operation expression for $h_1$ is illustrated. However, the same operation may be performed in other neurons in the first intermediate layer as well.

$$f(x) = \max(0, x) = \begin{cases} 0 & (x \leq 0) \\ x & (x \geq 0) \end{cases} \quad (2)$$

Further, the same applies to the subsequent layers. For example, when a weight between the first intermediate layer and the second intermediate layer is W2, an operation of calculating a sum of products using the output of the first intermediate layer and the weight W2, adding a bias, and applying an activation function is performed in the neuron of the second intermediate layer. In the neuron of the output layer, an operation of weighting and adding outputs of an immediately previous layer, and adding a bias is performed. In the example in FIG. 8, the immediately previous layer of the output layer is the second intermediate layer. In the neural network, an operation result in the output layer is an output of the neural network.

As can be appreciated from the above description, it is necessary to set an appropriate weight and bias in order to obtain a desired output from an input. Note that, in the following, the weight is also referred to as a weighting coefficient. Further, the weighting coefficient may include a bias. In learning, a data set in which a given input x is associated with a correct output for the input is prepared. The correct output is a label. Learning processing of the neural network can be considered as processing of calculating the most probable weighting coefficient based on the data set. Note that, in the learning processing of the neural network, various learning methods such as backpropagation have been known. In the present embodiment, the learning methods can be widely applied, and thus a detailed description is omitted.

Further, the neural network is not limited to have the configuration illustrated in FIG. 8. For example, in the learning processing and inference processing according to the present embodiment, a convolutional neural network (CNN) that has been widely known may be used. The CNN includes a convolutional layer and a pooling layer. The convolutional layer performs a convolution operation. Specifically, the convolution operation here is filtering processing. The pooling layer performs processing of reducing horizontal and vertical dimensions of data. For example, when image information is input, the CNN can perform processing considering a relationship between a given pixel and a pixel around the given pixel. In the CNN, a characteristic of a filter used in the convolution operation is learned by performing learning processing using backpropagation or the like. That is, the characteristic of the filter in the CNN is included in the weighting coefficient in the neural network.

Hereinabove, an example in which the learned model is a model using the neural network has been described. However, the machine learning in the present embodiment is not limited to a method using the neural network. For example, various types of widely known machine learning such as a support vector machine (SVM), or a type of machine learning that is advanced from such types of machine learning can be applied to the method according to the present embodiment.

The storage control section 150 causes the server HDD 34 to store the learned model 53 generated by the learned model generation section 140.

The predicted consumption calculation section 160 calculates predicted consumption of ink of the printer A used by the user A based on attribute information of the user A acquired by the acquisition section 120 and the learned model 53 stored on the server HDD 34. That is, the predicted consumption calculation section 160 inputs the attribute information of the user A to the learned model 53 to obtain predicted consumption as an output from the learned model 53. Further, the predicted consumption calculation section 160 calculates predicted consumption of each type of ink, that is, ink of each color.

The delivery determination section 170 determines, based on the predicted consumption calculated by the predicted consumption calculation section 160, the number and color of an ink bottle to be delivered to the user A. In the present embodiment, the delivery determination section 170 determines, based on the predicted consumption calculated by the predicted consumption calculation section 160 and for a color of ink estimated to be running out from the current time until a predetermined period of time elapses, delivery of ink bottles of which the number corresponds to predicted consumption within a predetermined period. Note that the delivery determination section 170 may determine, as the amount of ink, the volume of ink, for example, "deliver 100 ml of ink".

Next, a flow of learned model generation processing performed by the server 3 will be described with reference to a flowchart of FIG. 9. The server 3 performs the learned model generation processing periodically or when a predetermined trigger such as an update of the collected data 52 occurs.

In S01, the second attribute estimation section 130 estimates an attribute of each user based on the subscriber information and the image data in the collected data 52 stored on the server HDD 34.

In S02, the learned model generation section 140 generates for each user a data set by combining attribute information of each user that indicates the attribute of each user that is estimated in S01 and consumption result information indicating a consumption result of the printer 2 used by each user.

In S03, the learned model generation section 140 performs machine learning using the data set generated in S02 and generates the learned model 53. The server 3 stores the generated learned model 53 on the server HDD 34. Further, when the learned model 53 is already stored on the server HDD 34, the server 3 updates the learned model 53 by using the generated learned model 53.

Next, a flow of delivery determination processing performed by the server 3 will be described with reference to a flowchart of FIG. 10. The server 3 periodically performs the delivery determination processing. Note that, when the learned model generation processing is periodically performed, an interval of the learned model generation processing and an interval of the delivery determination processing may be the same as each other or different from each other.

In S11, the first attribute estimation section 110 estimates the attribute of the user A based on the subscriber information and the image data in the collected data 52 of the user A that is stored on the server HDD 34.

In S12, the delivery determination section 170 calculates a remaining amount of ink for the user A based on the ink consumption information in the collected data 52 of the user A, that is, the ink consumption information of the printer A. For example, when the delivery determination processing is performed monthly, the server 3 calculates a remaining amount of ink by subtracting, from a remaining amount of ink that is calculated a month ago, ink consumption obtained from the ink consumption information. Therefore, the server 3 stores the remaining amount of ink calculated in S12 as a part of the ink consumption information. Note that the calculation of the remaining amount of ink in S12 and calculation of predicted consumption to be described later are performed for all colors used in the printer A.

In S13, the delivery determination section 170 compares the remaining amount of ink calculated in S12 with a determination threshold to determine whether or not delivery of ink is needed. The determination threshold is a predetermined threshold value of the amount of ink. For example, in a case where the determination threshold is 30 ml, the server 3 determines that the delivery of ink is needed when the remaining amount of ink is less than 30 ml.

In S14, when it is determined that the delivery of ink is needed in S13, the delivery determination section 170 proceeds to S15. Further, when it is determined that the delivery of ink is not needed in S13, the server 3 terminates the delivery determination processing. Note that, in S14, when the number of colors for which it is determined that delivery of ink is needed among a plurality of colors used in the printer A is one, it is determined that the delivery of ink is needed.

In S15, the predicted consumption calculation section 160 calculates predicted consumption of ink likely to be consumed in the next three months based on the attribute of the user A that is calculated in S11 by referring to the learned model 53. That is, the server 3 calculates the predicted consumption of ink likely to be consumed in the next three months from a current date by referring to the segment S corresponding to the attribute of the user A in the learned model 53.

In S16, the delivery determination section 170 determines delivery of ink for the ink that is to run out within three months. Here, the server 3 determines the color and number of ink bottles to be delivered. For example, when black is included in the colors used in the printer A, the ink capacity per one black ink bottle is 100 ml, and predicted consumption after three months is 250 ml, the server 3 determines that three black ink bottles are to be delivered, such that the remaining amount of black ink does not fall below the determination threshold within at least three months. Further, in S16, when it is determined that a plurality of colors of ink are to run out within three months, the server 3 determines the number of ink bottles to be delivered for each color and determines to collectively deliver a determined number of ink bottles of each color.

As described above, based on the attribute information of the user A and the learned model 53, the device management system SY according to the present embodiment can calculate predicted consumption of ink of the printer A used by the user A. Therefore, the service provider can appropriately determine the number of ink bottles to be delivered. That is, when delivery of ink is determined by only comparing ink consumption information with a threshold value, the delivery of ink is to be performed frequently in a period in which ink consumption is high. However, as delivery of ink is determined in consideration of predicted ink consumption according to an attribute of a user, it is possible to reduce the number of deliveries of ink and reduce the delivery cost. Further, since the delivery cost can be reduced as described above, the service provider can provide the delivery service to the user at a lower price.

Further, since the device management system SY generates the learned model 53 that is obtained by learning, by machine learning, for a plurality of users, a combination of attribute information and consumption result information as a data set, it is possible to obtain predicted consumption of the ink of the printer A by only inputting the attribute information of the user A into the learned model 53. Further, since the device management system SY performs the learned model generation processing periodically or when a predetermined trigger occurs and performs estimation of an attribute of each user and an update of the learned model 53 each time the learned model generation processing is performed, it is possible to obtain predicted consumption with high reliability.

Since the device management system SY estimates an attribute of a user based on an analysis result of image data to be printed by the printer 2, it is possible to more appropriately estimate an attribute of a user, as compared with a case of estimating an attribute of a user only with subscription information of the user.

Note that the following modified examples can be adopted, regardless of the above-described embodiment. The respective modified examples can be appropriately combined.

Modified Example 1

The first attribute estimation section 110 may estimate the attribute of the user A based on a usage status of the printer 2, instead of or in addition to an image data analysis result. Similarly, the second attribute estimation section 130 may estimate an attribute of each user based on a usage status of each printer 2 used by each of a plurality of users, instead of or in addition to an image data analysis result. In this case, the server 3 acquires usage status information for specifying the usage status of the printer 2 from the printer 2, and stores the acquired usage status information as a part of the collected data 52. Then, the server 3 estimates an attribute of a user based on the usage status information. As the usage status information, information indicating a print date or the number of copies can be acquired. Further, as a part of the usage status information, the ink consumption information may be acquired. In this case, the server 3 can estimate, as an attribute of a user, a combination of a specific period or season and a printing amount, such as the end of the month and a large number of printing shots, the end of the fiscal year and a large amount of monochrome printing, and spring and a large number of copies, as the usage status of the printer 2.

Modified Example 2

An attribute estimation method of the first attribute estimation section 110 and an attribute estimation method of the second attribute estimation section 130 may be different from each other. Further, the second attribute estimation section 130 and the learned model generation section 140 may be omitted. In this case, the storage control section 150 may cause the server HDD 34 to store relationship information which is information indicating a relationship between attribute information indicating an attribute of a user who uses the printer 2, and consumption information indicating consumption of ink, and is not machine-learned, instead of the learned model 53. Further, at least one of the first attribute estimation section 110 and the second attribute estimation section 130 may be omitted. In this case, as a part of the subscriber information, attribute information of a user may be stored on the server HDD 34.

Modified Example 3

The predicted consumption calculation section 160 may calculate predicted consumption based on period information such as a season for which predicted consumption is calculated or an event of a period for which predicted consumption is calculated. For example, when the attribute information indicates "a user with a child", since it is predicted that the amount of pictures to be printed increases after a field day season, the predicted consumption calculation section 160 can use a calculation method in which predicted consumption from September to November is calculated to be more than usual, for example. In this case, the storage control section 150 may store, in the server HDD 34, relationship information that indicates a relationship between attribute information and consumption information indicating predicted consumption for each month.

Modified Example 4

In the delivery determination processing (see FIG. 10), the predicted consumption calculation section 160 does not calculate predicted consumption after determining that the delivery of ink is needed, but may simultaneously determine whether or not the delivery of ink is needed and the amount and type of ink to be delivered, based on a remaining amount of ink for the user A and predicted consumption from the current time until a predetermined period of time elapses.

Modified Example 5

When the printer 2 can detect a remaining amount of ink in the printer 2, the server 3 may acquire information indicating the remaining amount of the ink that is detected by the printer 2 and determine the remaining amount of the ink based on the acquired information.

Modified Example 6

The server 3 may determine ink consumption based on an analysis result of image data acquired from the user terminal 1 instead of determining ink consumption based on ink consumption information acquired from the printer 2. In this case, the server 3 may acquire, from the user terminal 1, print instruction information including color information indicating monochrome printing or color printing and paper sheet size information indicating the size of a paper sheet, in addition to the image data, and determine ink consumption based on the image data and the print instruction information.

Modified Example 7

The server 3 does not acquire image data from the user terminal 1, but may acquire image data from the printer 2. In this case, when image data is acquired from the user terminal 1, or when printing based on acquired image data ends, the printer 2 may transmit the acquire image data to the server 3. Further, in this case, subscriber information need not include identification information of the user terminal 1.

Modified Example 8

The second attribute estimation section 130 may be omitted, and the predicted consumption calculation section 160 may calculate predicted consumption of ink of the printer A only based on past ink consumption information of the user A. In this case, the attribute information indicating an attribute of a user is concept including information that specifies a user, for example, identification information of the user. Further, for identification information of each user, the learned model generation section 140 may learn, by machine learning, an ink consumption tendency of a user for each month and each color as the consumption result information.

Modified Example 9

The device management system SY may deliver an ink cartridge that is attachable to and detachable from the printer 2, instead of an ink bottle. The ink cartridge is an example of the "container". In this case, the user may replace the ink cartridge when a remaining amount of ink became small. Further, in this case, the server 3 may acquire information indicating replacement of the ink cartridge from the printer 2, and determine the stock of ink for the user. When the printer 2 is an electrophotographic printer, the device management system SY may deliver a toner cartridge, instead of ink. In addition, a coloring agent other than ink and toner may be delivered according to a printing method or usage of the printer 2.

Modified Example 10

The delivery determination section 170 may determine delivery of a printing medium as a consumable product of the printer 2, instead of ink. In this case, the server 3 acquires, as the consumption result information, information indicating consumption of a printing medium, that is, the number of sheets used. Further, examples of the type of the printing medium include a paper sheet size and a paper sheet type.

Modified Example 11

In addition to the printer 2, an electronic device that consumes a consumable product may be used as a device. Examples of the electronic device that consumes a consumable product include a copying machine that consumes a printing medium and a coloring agent and a multifunction peripheral having a printing function, a copying function, a faxing function, and a scanning function.

Modified Example 12

Hereinabove, the embodiment and the respective modified examples have been described, and the embodiment and the respective modified examples may be combined. Further, a method of performing the respective processing performed by the user terminal 1, the printer 2, or the server 3 described in the embodiment and the respective modified examples, a program for performing the respective processing, or a computer-readable recording medium in which the program is recorded also falls within the scope of the present disclosure. In addition, appropriate modification can be made without departing from the spirit of the present disclosure.

APPENDIX

Hereinafter, the device management system, the server, and the method of controlling a device management system will be additionally described.

The device management system SY includes: the storage control section 150 storing, in the storage section, relationship information that indicates a relationship between attribute information that indicates an attribute of a user of a device and consumption information indicating consumption of a consumable product of the device; the acquisition section 120 acquiring the attribute information of the first user; and the predicted consumption calculation section 160 calculating, based on the attribute information of the first user and the relationship information, predicted consumption of the consumable product of the device used by the first user.

The server 3 includes: the storage control section 150 storing, in the storage section, relationship information that indicates a relationship between attribute information indicating an attribute of a user of a device and consumption information indicating consumption of a consumable product of the device; the acquisition section 120 acquiring the attribute information of the first user; and the predicted consumption calculation section 160 calculating, based on the attribute information of the first user and the relationship information, predicted consumption of the consumable product of the device used by the first user.

The method of controlling the device management system SY causes a computer to perform: causing the storage section to store relationship information that indicates a relationship between attribute information indicating an attribute of a user of a device and consumption information indicating consumption of a consumable product of the device; acquiring the attribute information of the first user; and calculating, based on the attribute information of the first user and the relationship information, predicted consumption of the consumable product of the device used by the first user.

With this configuration, the device management system SY can calculate predicted consumption of a consumable product of the device used by the user A, based on the attribute information of the first user and the relationship information. As a result, the device management system SY can perform delivery of a consumable product based on predicted consumption of the consumable product, and a delivery cost reduction effect can be expected.

The device management system SY described above may further include the delivery determination section 170 that determines, based on the predicted consumption, the amount of the consumable product or the number of containers containing the consumable product to be delivered to the first user.

With this configuration, the device management system SY can determine, based on the predicted consumption of the consumable product, the amount of the consumable product or the number of containers containing the consumable product to be delivered to the first user.

In the device management system SY, the consumable product may include a plurality of types of consumable products, and the delivery determination section 170 may determine, based on predicted consumption of each type of consumable product, the type of the consumable product to be delivered to the first user.

With this configuration, the device management system SY can determine the type of the consumable product to be delivered to the first user based on predicted consumption of the consumable product.

The device management system SY described above may further include the learned model generation section 140 generating the learned model 53 that learned, by machine learning, for a plurality of users, as a data set, a combination of attribute information and consumption result information, which is a consumption result of a consumable product, the storage control section 150 may store, in the storage section, as the relationship information the learned model 53 that is generated, and the predicted consumption calculation section 160 may input the attribute information of the first user to the learned model 53 to obtain predicted consumption as an output from the learned model 53.

With this configuration, the device management system SY can generate the learned model 53 and input the attribute information of the first user to the generated learned model 53 to obtain, as an output from the learned model 53, predicted consumption of a consumable product of a device used by the first user.

In the device management system SY described above, the learned model 53 may indicate predicted consumption for each segment S obtained by clustering based on attribute information, and the predicted consumption calculation section 160 may specify a segment S corresponding to the attribute information of the first user and obtain predicted consumption indicated by the segment S that is specified.

With this configuration, the device management system SY can obtain predicted consumption of a consumable product of a device used by the user A by specifying the segment S of the learned model 53 that corresponds to the attribute information of the first user.

In the device management system SY described above, the device may be the printer 2 that consumes a consumable product by performing printing based on image data. The device management system SY may further include the first attribute estimation section 110 estimating an attribute of the first user based on at least one of an analysis result of image data to be printed by the printer 2 used by the first user and a usage status of the printer 2, and the acquisition section 120 may acquire attribute information indicating the attribute estimated by the first attribute estimation section 110.

With this configuration, the device management system SY can estimate the attribute of the first user based on at least one of the analysis result of image data to be printed by the printer 2 and the usage status of the printer 2.

The device management system SY described above may further include the second attribute estimation section 130 estimating, for the plurality of users, an attribute of each user based on at least one of an analysis result of image data to be printed by the printer 2 used by each user and a usage status of the printer 2, and the learned model generation section 140 may generate the learned model 53 by using attribute information indicating the attribute estimated by the second attribute estimation section 130.

With this configuration, the device management system SY can estimate, for the plurality of users, an attribute of each user based on at least one of an analysis result of image data to be printed by the printer 2 used by each user and a usage status of the printer 2, and use the estimated attribute for the generation of the learned model 53.

In the device management system SY described above, the consumable product may be a coloring agent used in printing performed by the printer 2.

With this configuration, the device management system SY can calculate predicted consumption of the coloring agent used in printing performed by the printer 2.

What is claimed is:

1. A device management system comprising:
    a computer hardware storage device storing relationship information that indicates a relationship between attribute information indicating an attribute of a user of a device and consumption information indicating consumption of a consumable product of the device;
    a processor that, in response to executed computer readable instructions stored on the computer hardware storage device, instantiates an acquisition section acquiring the attribute information of a first user;
    the processor that, in response to executed computer readable instructions stored on the computer hardware storage device, instantiates a predicted consumption calculation section calculating, based on the attribute information of the first user and the relationship information, predicted consumption of the consumable product of the device used by the first user; and
    the processor that, in response to executed computer readable instructions stored on the computer hardware storage device, instantiates a learned model generation section generating a learned model that learned, by machine learning, for a plurality of users, as a data set, a combination of the attribute information and consumption result information, which is a consumption result of the consumable product, wherein
    the storage section stores as the relationship information the learned model that is generated, and
    the predicted consumption calculation section inputs the attribute information of the first user to the learned model to obtain the predicted consumption as an output from the learned model.

2. The device management system according to claim 1, further comprising the processor that, in response to executed computer readable instructions stored on the computer hardware storage device, instantiates a delivery determination section determining, based on the predicted consumption, an amount of the consumable product or a number of containers that contain the consumable product to be delivered to the first user.

3. The device management system according to claim 2, wherein
    the consumable product includes a plurality of types of consumable products, and
    the delivery determination section determines, based on the predicted consumption of each type of the consumable product, a type of the consumable product to be delivered to the first user.

4. The device management system according to claim 1, wherein
    the learned model indicates the predicted consumption for each segment obtained by clustering based on the attribute information, and
    the predicted consumption calculation section specifies the segment corresponding to the attribute information of the first user and obtains the predicted consumption indicated by the segment that is specified.

5. The device management system according to claim 1, wherein
    the device is a printer that consumes the consumable product by performing printing based on image data,
    the device management system further comprises a first attribute estimation section estimating an attribute of the first user based on at least one of an analysis result of the image data to be printed by the printer used by the first user and a usage status of the printer, and
    the acquisition section acquires the attribute information indicating the attribute estimated by the first attribute estimation section.

6. The device management system according to claim 4, further comprising a second attribute estimation section estimating, for the plurality of users, the attribute of each user based on at least one of an analysis result of the image data to be printed by the printer used by each user and a usage status of the printer, wherein
    the learned model generation section generates the learned model by using the attribute information indicating the attribute estimated by the second attribute estimation section.

7. The device management system according to claim 5, wherein
the consumable product is a coloring agent used in printing performed by the printer.

8. A server comprising:
a computer hardware storage device storing relationship information that indicates a relationship between attribute information indicating an attribute of a user of a device and consumption information indicating consumption of a consumable product of the device;
a processor that, in response to executed computer readable instructions stored on the computer hardware storage device, instantiates an acquisition section acquiring the attribute information of a first user;
the processor that, in response to executed computer readable instructions stored on the computer hardware storage device, instantiates a predicted consumption calculation section calculating, based on the attribute information of the first user and the relationship information, predicted consumption of the consumable product of the device used by the first user; and
the processor that, in response to executed computer readable instructions stored on the computer hardware storage device, instantiates a learned model generation section generating a learned model that learned, by machine learning, for a plurality of users, as a data set, a combination of the attribute information and consumption result information, which is a consumption result of the consumable product, wherein
the storage section stores as the relationship information the learned model that is generated, and
the predicted consumption calculation section inputs the attribute information of the first user to the learned model to obtain the predicted consumption as an output from the learned model.

9. A method of controlling a device management system, the method causing a computer to perform:
causing a storage section to store relationship information that indicates a relationship between attribute information indicating an attribute of a user of a device and consumption information indicating consumption of a consumable product of the device;
acquiring the attribute information of a first user;
calculating, based on the attribute information of the first user and the relationship information, predicted consumption of the consumable product of the device used by the first user; and
causing a learned model generation section to generate a learned model that learned, by machine learning, for a plurality of users, as a data set, a combination of the attribute information and consumption result information, which is a consumption result of the consumable product, wherein
the storage section stores as the relationship information the learned model that is generated, and
a predicted consumption calculation section inputs the attribute information of the first user to the learned model to obtain the predicted consumption as an output from the learned model.

* * * * *